Figure 1:
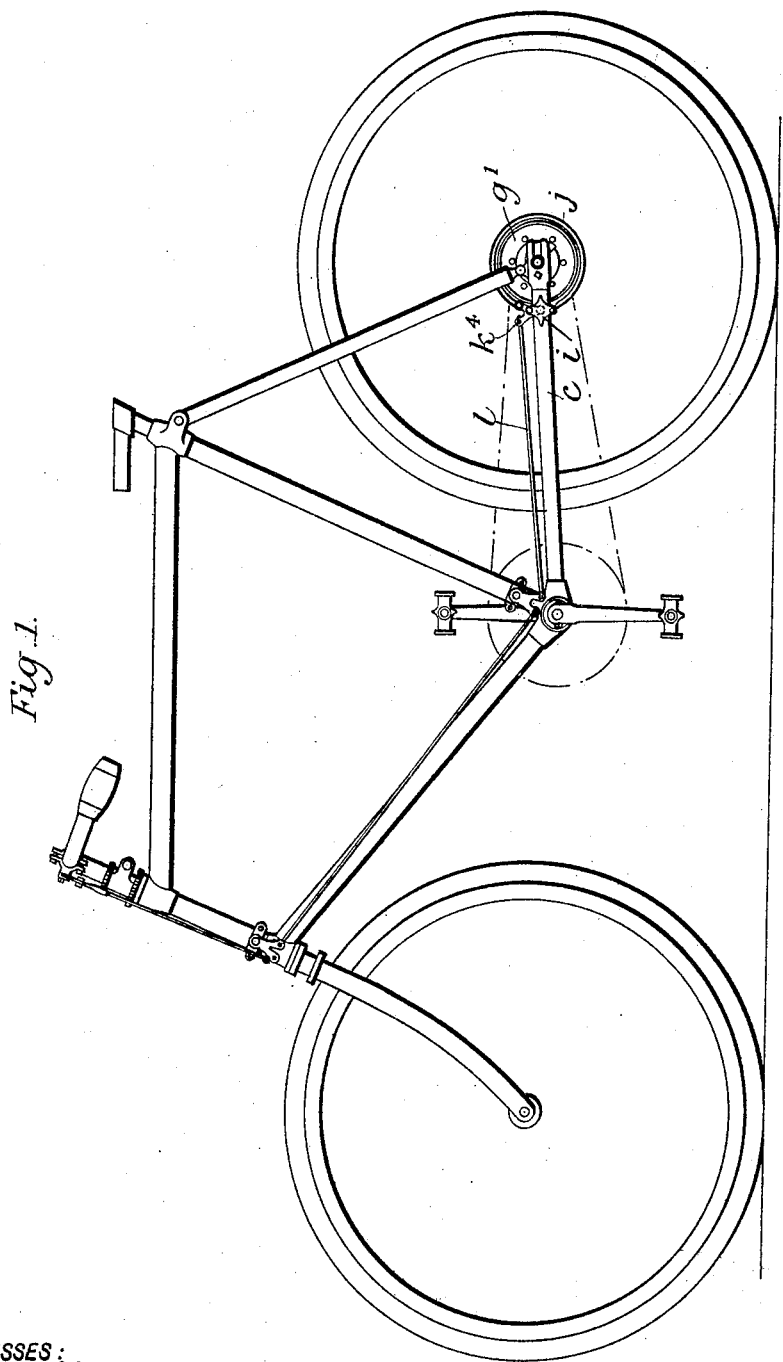

No. 682,860.　　　　　　　　　　　　　　　　Patented Sept. 17, 1901.
J. H. PUNCHARD.
BAND BRAKE WHEEL.
(Application filed Mar. 29, 1901.)

(No Model.)　　　　　　　　　　　　　　　　3 Sheets—Sheet 1.

WITNESSES:　　　　　　　　　　　　　　　　INVENTOR
　　　　　　　　　　　　　　　　　　　　　　John Henry Punchard
　　　　　　　　　　　　　　　　　　　BY
　　　　　　　　　　　　　　　　　　　　　　ATTORNEYS.

No. 682,860. Patented Sept. 17, 1901.
J. H. PUNCHARD.
BAND BRAKE WHEEL.
(Application filed Mar. 29, 1901.)

(No Model.) 3 Sheets—Sheet 2.

WITNESSES:
George B. Geibel
H. Fulerbur

INVENTOR
John Henry Punchard
BY
Lowell Wahle
ATTORNEYS.

No. 682,860. Patented Sept. 17, 1901.
J. H. PUNCHARD.
BAND BRAKE WHEEL.
(Application filed Mar. 29, 1901.)

(No Model.) 3 Sheets—Sheet 3.

WITNESSES:
George D. Seibel
H. Tuberter

INVENTOR
John Henry Punchard
BY Horace A. Wahle
ATTORNEYS.

UNITED STATES PATENT OFFICE.

JOHN HENRY PUNCHARD, OF LONDON, ENGLAND.

BAND-BRAKE WHEEL.

SPECIFICATION forming part of Letters Patent No. 682,860, dated September 17, 1901.

Application filed March 29, 1901. Serial No. 53,421. (No model.)

*To all whom it may concern:*

Be it known that I, JOHN HENRY PUNCHARD, cycle manufacturer, a subject of the King of Great Britain, residing at 249 Pentonville road, London, England, have invented certain new and useful Improvements in Band-Brake Wheels, of which the following is a specification.

This invention relates to detachable band-brake wheels, especially applicable to the hubs of bicycle or other vehicle wheels, and has for its object more especially to arrange and construct detachable band-brake wheels for application to the hubs of bicycles in such wise that said band-brake wheels can be applied to the ordinary hubs of any well-known or suitable character.

The invention resides in the combination, with the end portion of a wheel-hub, said end portion having an annular shoulder, of split-ring portions immovably secured around said end portion, an inwardly-projecting flange on said split-ring portions and fitting behind said annular shoulder, an outwardly-projecting flange on said split-ring portions, and a ring secured to said outwardly-projecting flange and adapted to form the braking-surface. This said complete ring or rim is attached to the aforesaid flange or arms on the split-ring portions in any suitable manner—for instance, by screws, bolts, &c. By these means I am thus enabled to mount and fix on the hub of cycle-wheels or other vehicle-wheels a detachable band-brake wheel, to which a band-brake can be applied in the usual or any suitable manner.

Obviously detachable band-brake wheels constructed according to my present invention may be applied to the hub of either the back or front wheel of a bicycle or may be applied to any of the wheels or any other part of any other vehicle—as, for instance, motor-cars—provided such hub or part is adapted to be fitted with band-brake wheels according to my present invention, and in order that my invention may be easily understood and readily carried into practice I will proceed to describe the same with reference to the drawings hereunto annexed.

Figure 2:
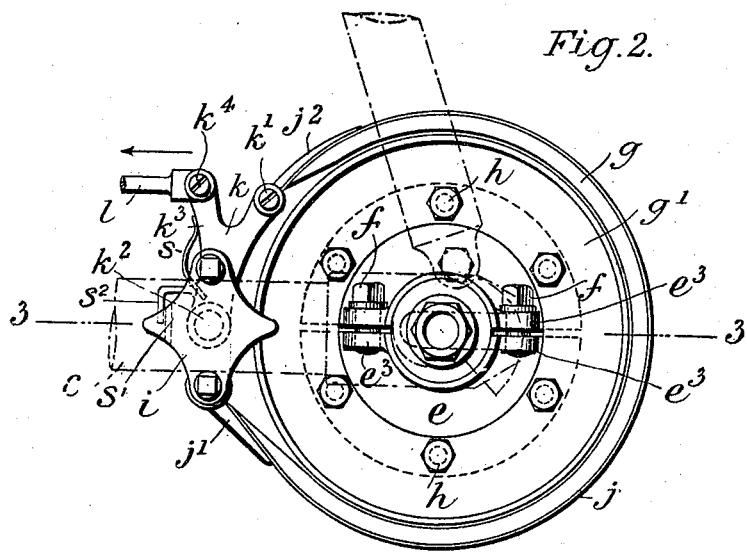
Figure 3:
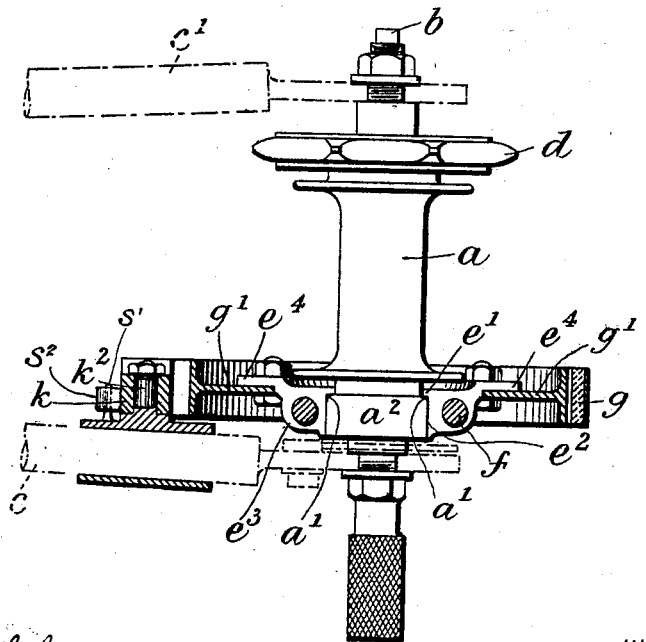
Figure 4:
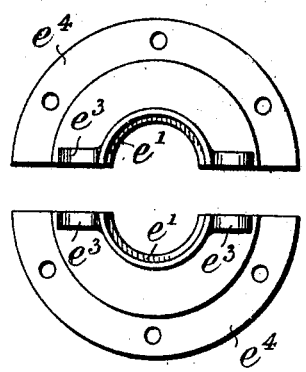
Figure 5:
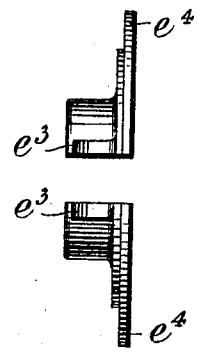
Figure 6:
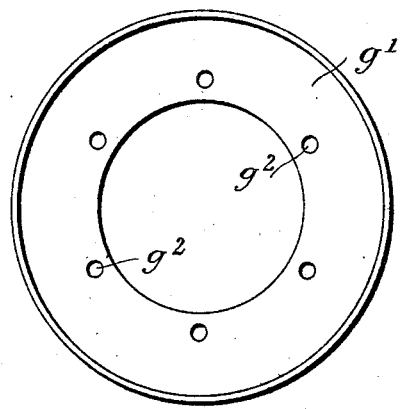

Figure 1 is a view in side elevation of an ordinary bicycle with the band-brake wheel fitted to the hub of the back wheel according to my present invention. Fig. 2 is a local view, (side elevation,) on a greatly-enlarged scale, of the hub with band-brake wheel mounted thereon according to my invention. Fig. 3 is a plan of Fig. 2, showing the band-brake wheel and hub in horizontal section on line 3 3, Fig. 2. Fig. 4 shows the two split-ring portions $e$ separately in side elevation. Fig. 5 is an edge view thereof. Fig. 6 shows the band-brake wheel separately in side elevation.

$a$ is the back-wheel hub, of the well-known ordinary character, mounted on the axle $b$, carried on the back forks $c\ c'$. The hub $a$ has an annular shoulder $a'$ thereon or may be provided with any equivalent formation toward the end of said hub and opposite to the end on which the brake-wheel $d$ is fixed and driven by the sprocket-chain.

The split-ring portions $e$ (shown in two halves in Fig. 4) are provided with an inwardly-projecting flange $e'$, adapted to fit behind the shoulder $a'$ on the hub, while the interior circumference $e^2$ of said split-ring portions $e$ are made to conform to the exterior form of the portion $a^2$ of the hub $a$, (or with hubs having the end portion $a^2$ thereof of different form to that shown in the drawings the interior circumference of said split-ring portions $e$ would be formed to correspond.) The object of the inwardly-projecting flange $e'$ is to prevent lateral displacement of the split-ring portions $e$ with respect to the hub after same have been affixed thereon. The two split-ring portions $e$ are flattened at each end to form lugs $e^3$, which are provided with holes therein, so that when these two split-ring portions have been placed in position on the end $a^2$ of the hub they can be there immovably secured by means of suitable bolts and nuts $f$, passed through the lugs $e^3$ and tightly screwed up, whereby rotation of the hub without the split-ring portions $e$ is rendered impossible. To the outwardly-projecting flange $e^4$ of the two split-ring portions $e$ (after the latter are thus locked on the hub) I bolt the web $g'$ of the complete ring or rim $g$—for instance, by a series of bolts $h$ and locking-nuts, as shown in Figs. 2 and 3—so that the band-brake wheel formed of the parts $g$ and $e$ is thus immovably mounted on the end $a^2$ of the ordinary or any suitable hub, such as $a$. Any suitable band-brake adapted to act on the rim $g$ of this band-brake wheel may be employed, and for the sake of example I have shown in Figs. 2 and 3 suitable band-brake mechanism, and in Fig. 1 have further illustrated same, showing connections for operating such band-brake from the brake-lever, mounted adjacent to the handle-bars of a bicycle; but it will be obvious that such band-brake may be arranged and mounted in any other suitable manner and operated in any other suitable manner from any other part of the machine.

The band-brake mechanism illustrated in the drawings consists of a clip or mount $i$, screwed, clamped, or otherwise locked immovably to the back fork $c$ and at its lower end having the end $j'$ of the band-brake $j$ hinged thereto at a point just below the level of the back fork $c$, while the other end $j^2$ of such band-brake $j$ is attached at $k'$ to bell-crank $k$, which latter is pivoted at $k^2$ to the mount $i$, just about the middle of the back fork $c$, while the other arm $k^3$ has attached thereto at $k^4$ the connecting-rod $l$, which may be operated in any suitable manner, as aforesaid—for instance, by the brake-operating mechanism shown in Fig. 1. A suitable spring $s$, which may be fixed on the clip or mount $i$, bears upon and is adapted to normally hold the bell-crank pressed toward the rim $g$, a stop, consisting preferably of a flange $s'$ on the clip and a bent abutting finger or hook $s^2$ on the bell-crank, being provided so as to prevent the said bell-crank touching said rim $g$. Hence a very small movement of the rod $l$ will tighten the brake-band $j$ on and around the rim $g$ of the band-brake wheel. In the present invention it is to be understood and it is evident that arms in place of the flange $e^4$ are the equivalent thereof.

Having now described my invention, what I claim as new, and desire to secure by Letters Patent of the United States, is—

1. The combination, with the end portion of a wheel-hub, said end portion having an annular shoulder, of split-ring portions immovably secured around said end portion, an inwardly-projecting flange on said split-ring portions and fitting behind said annular shoulder, an outwardly-projecting flange on said split-ring portions, and a ring secured to said outwardly-projecting flange and adapted to form the braking-surface, substantially as set forth.

2. The combination, with the end portion $a^2$ of the wheel-hub, said end portion having an annular shoulder $a'$, of split-ring portions $e\ e$, immovably secured around the said end portion $a^2$, an inwardly-projecting flange $e'$ on said split-ring portions $e\ e$ and fitting behind the annular shoulder $a'$ to prevent lateral displacement of said split-ring portions $e\ e$, an outwardly-projecting flange $e^4$ on said split-ring portions $e\ e$, a complete ring provided with a rim $g$ and an inwardly-projecting flange or web $g'$ suitably secured to said flange $e^4$, so that the outer circumference of the said rim may serve as a braking-surface, substantially as set forth.

In witness whereof I have hereunto set my hand in presence of two witnesses.

JOHN HENRY PUNCHARD.

Witnesses:
H. D. JAMESON,
A. NUTTING.